United States Patent
Sarikhani et al.

(10) Patent No.: US 11,177,703 B2
(45) Date of Patent: Nov. 16, 2021

(54) ROTOR ASSEMBLY FOR PERMANENT MAGNET ELECTRIC MOTOR WITH RADIALLY BIASING SHAFT STRUCTURE

(71) Applicant: Garrett Transportation I Inc., Torrance, CA (US)

(72) Inventors: Ali Sarikhani, Irvine, CA (US); Jeffrey Lotterman, Los Angeles, CA (US); Sushank Singampalli, Lakewood, CA (US)

(73) Assignee: GARRETT TRANSPORTATION I INC, Torrance, CA (US)

( * ) Notice: Subject to any disclaimer, the term of this patent is extended or adjusted under 35 U.S.C. 154(b) by 281 days.

(21) Appl. No.: 16/535,996

(22) Filed: Aug. 8, 2019

(65) Prior Publication Data
US 2021/0044163 A1 Feb. 11, 2021

(51) Int. Cl.
| H02K 1/27 | (2006.01) |
|---|---|
| H02K 1/17 | (2006.01) |
| H02K 5/02 | (2006.01) |
| H02K 15/02 | (2006.01) |
| H02K 15/14 | (2006.01) |
| H02K 21/02 | (2006.01) |

(52) U.S. Cl.
CPC ............. *H02K 1/27* (2013.01); *H02K 1/17* (2013.01); *H02K 5/02* (2013.01); *H02K 15/02* (2013.01); *H02K 15/14* (2013.01); *H02K 21/02* (2013.01)

(58) Field of Classification Search
CPC .. H02K 1/17; H02K 1/27; H02K 5/02; H02K 15/02; H02K 15/14; H02K 21/02
USPC ............. 310/46, 156.08, 156.09, 216.116, 310/216.121, 216.122, 216.124
See application file for complete search history.

(56) References Cited

U.S. PATENT DOCUMENTS

| 3,204,134 | A | * | 8/1965 | Schneider | ............... H02K 1/28 310/216.137 |
|---|---|---|---|---|---|
| 4,501,981 | A | * | 2/1985 | Hansen | ............... H02K 37/14 310/209 |

(Continued)

FOREIGN PATENT DOCUMENTS

| DE | 20307198 U1 | 9/2003 | |
|---|---|---|---|
| DE | 102017114720 A1 * | 1/2019 | ............... H02K 1/28 |

(Continued)

OTHER PUBLICATIONS

Toma, Optimization of rotor shaft shrink fit method for motor using "Robust design", Journal of Industrial Engineering International, Jan. 10, 2018, 14:705-717, National Institute of Technology, Tsuruoka College, Tsuruoka, Japan.

*Primary Examiner* — Jose A Gonzalez Quinones
(74) *Attorney, Agent, or Firm* — Lorenz & Kopf LLP

(57) ABSTRACT

A rotor assembly for a permanent magnet electric motor defines an axis of rotation and includes a jacket member and a magnet member that is received within the jacket member. The magnet member defines a central aperture. The rotor assembly also includes a shaft structure with a base member and a biasing projection that projects from the base member. The biasing projection is received within the central aperture of the magnet member. The biasing projection biases the magnet member toward the jacket member in an outward radial direction away from the axis of rotation for retaining the magnet member and the jacket member together.

20 Claims, 6 Drawing Sheets

(56) References Cited

U.S. PATENT DOCUMENTS

| | | | | |
|---|---|---|---|---|
| 4,614,888 A | * | 9/1986 | Mosher | H02K 1/28 310/216.122 |
| 2002/0153783 A1 | * | 10/2002 | Lau | H02K 1/30 310/43 |
| 2006/0158053 A1 | * | 7/2006 | Aschoff | H02K 1/30 310/91 |
| 2016/0056677 A1 | * | 2/2016 | Ikuta | H02K 1/28 310/216.121 |
| 2016/0149449 A1 | * | 5/2016 | Ivanak | H02K 5/12 310/52 |
| 2016/0233753 A1 | * | 8/2016 | Benner, Jr. | G02B 26/10 |
| 2017/0373548 A1 | | 12/2017 | Arimatsu | |
| 2019/0043061 A1 | * | 2/2019 | Hotori | G06Q 30/02 |
| 2019/0145416 A1 | * | 5/2019 | Donato | F04D 25/024 415/100 |

FOREIGN PATENT DOCUMENTS

| | | | | | |
|---|---|---|---|---|---|
| JP | 55034859 A | * | 3/1980 | | |
| JP | 59092754 A | * | 5/1984 | | H02K 1/2733 |
| JP | 02294241 A | * | 12/1990 | | |
| JP | 05033788 A | * | 2/1993 | | |
| JP | 05200475 A | * | 8/1993 | | |

\* cited by examiner

ROTOR ASSEMBLY FOR PERMANENT MAGNET ELECTRIC MOTOR WITH RADIALLY BIASING SHAFT STRUCTURE

TECHNICAL FIELD

The present disclosure generally relates to a motor and, more particularly, to a rotor assembly for a permanent magnet electric motor with a radially biasing shaft structure.

BACKGROUND

Permanent magnet electric motors can be used in a variety of applications. These motors provide high efficiency operation as well as other advantages.

However, many permanent magnet electric motors have deficiencies. Manufacturing methods may be highly complex, labor-intensive, and/or have other inefficiencies. Typically, parts are held to relatively high tolerances, which increases manufacturing complexity and cost.

Thus, it is desirable to provide a high-quality permanent magnet electric motor that can be manufactured in a highly efficient manner. Other desirable features and characteristics of the present disclosure will become apparent from the subsequent detailed description and the appended claims, taken in conjunction with the accompanying drawings and this background discussion.

BRIEF SUMMARY

In one embodiment, a rotor assembly is disclosed for a permanent magnet electric motor. The rotor assembly defines an axis of rotation. The rotor assembly includes a jacket member and a magnet member that is received within the jacket member. The magnet member defines a central aperture. The rotor assembly also includes a shaft structure with a base member and a biasing projection that projects from the base member. The biasing projection is received within the central aperture of the magnet member. The biasing projection biasing the magnet member toward the jacket member in an outward radial direction away from the axis of rotation for retaining the magnet member and the jacket member together.

In another embodiment, a method of manufacturing a rotor assembly for a permanent magnet electric motor is disclosed. The method includes providing a shaft structure having an axis. The shaft structure includes a base member and a biasing projection that projects from the base member in an axial direction along the axis. The biasing projection is resiliently flexible relative to the base member between a neutral position and a loaded position. The biasing projection is resiliently flexed toward the axis when moving from the neutral position toward the loaded position. Also, the method includes providing a magnet assembly that includes a magnet member received within a jacket member. The magnet member includes a central aperture. Additionally, the method includes moving the biasing projection into the central aperture of the magnet member including resiliently flexing the biasing projection away from the neutral position and toward the loaded position to bias the magnet member toward the jacket member in an outward radial direction away from the axis for retaining the magnet member and the jacket member together.

In an additional embodiment, a permanent magnet electric motor is disclosed. The motor includes a stator and a rotor assembly supported for rotation within the stator about an axis of rotation. The rotor assembly includes a jacket member that is hollow and cylindrical. The rotor assembly also includes a first arcuate magnet segment and a second arcuate magnet segment that are received within the jacket member and that extend about the axis of rotation. The magnet member defines a central aperture with an open first axial end and an open second axial end. Furthermore, the rotor assembly includes an inter-magnet plate that is disposed in a circumferential direction between the first arcuate magnet segment and the second arcuate magnet section. Also, the rotor assembly includes a first axial end plate disposed proximate the first axial end and engaged with the inter-magnet plate. The rotor assembly further includes a second axial end plate disposed proximate the second axial end and engaged with the inter-magnet plate. The rotor assembly also includes a first shaft structure with a first base member and a plurality of first biasing projections that project from the first base member. The first base member is engaged with the first axial end plate. The first biasing projections are disposed and spaced circumferentially about the axis of rotation. The first biasing projections are received within the central aperture of the magnet member. The first biasing projections are resiliently bent inward toward the axis of rotation from a neutral position toward a loaded position to bias the first and second arcuate magnet segments radially outward away from the axis of rotation. Moreover, the rotor assembly includes a second shaft structure with a second base member and a plurality of second biasing projections that project from the second base member. The second base member is engaged with the second axial end plate. The second biasing projections are disposed and spaced circumferentially about the axis of rotation. The second biasing projections are received within the central aperture of the magnet member and are resiliently bent inward toward the axis of rotation from a neutral position toward a loaded position to bias the first and second arcuate magnet segments radially outward away from the axis of rotation. The plurality of first biasing projections are spaced apart axially from the second biasing projections.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a well-built, high efficiency permanent magnet electric motor with a rotor assembly that has improved manufacturability. The rotor assembly may include a magnet member that is retained together with a jacket member using one or more shaft structures. The shaft structure(s) may be preloaded to bias the magnet member toward the jacket member in a radially outward direction. As will be discussed, this provides a number of manufacturing benefits. Also, the motor provides high efficiency operation, durability, and other advantages.

In some embodiments, the shaft structure may include one or more biasing members (e.g., biasing projections) that may be resiliently flexed radially inward. The biasing members may be bent inward to apply a preload that, in turn, biases the magnet member outward radially. The biasing members may be arranged and spaced apart in a circumferential direction for distributing the biasing load to the magnet member. Also, the biasing members may include one or more features, such as contoured surfaces, areas of reduced thickness, dimensions, etc. that ensure the biasing member positions the magnet member precisely and retains the magnet member securely. Also, the biasing member may be configured such that shaft structures and, ultimately, the rotor assembly may be manufactured efficiently, accurately, and in a repeatable fashion.

Also, the magnet member may include two or more segments. The biasing member(s) of the shaft structure may collectively bias the segments of the magnet member outward radially to position and retain the magnet segments against the jacket member. Furthermore, the rotor assembly may include one or more features that further retain components together. For example, the rotor assembly may include one or more inter-magnet members and axial end members that engage the magnet segments and/or the jacket member to securely retain the components.

Figure 1:
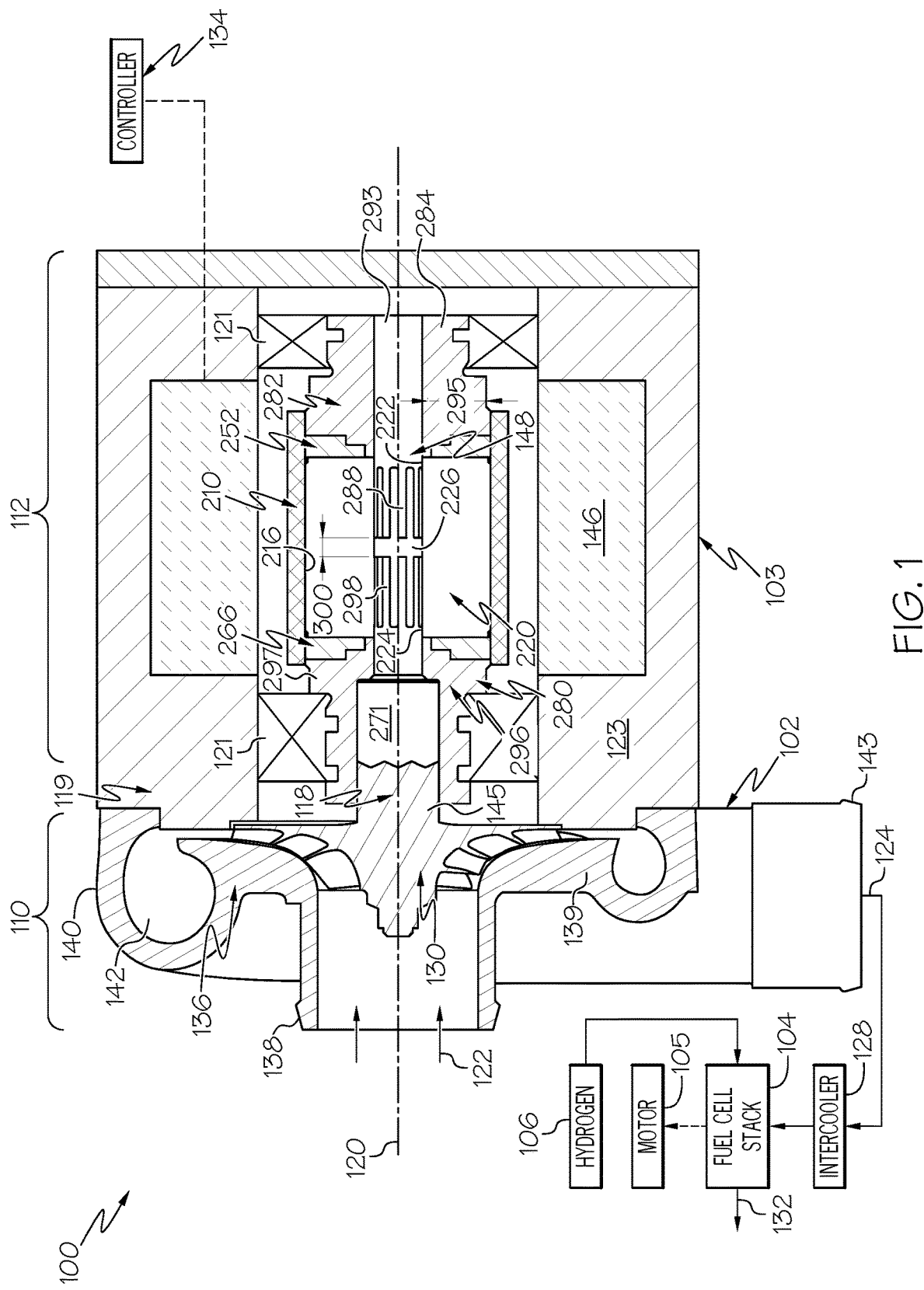
FIG. 1 is a schematic view of a fuel cell system with a permanent magnet electric motor according to example embodiments of the present disclosure.

Referring now to FIG. 1, a fuel cell system 100 with an example charging device 102 is shown. The charging device 102 includes an electric motor 103 with a rotor assembly 148 that is configured according to example embodiments of the present disclosure. It will be appreciated that the electric motor 103 and the rotor assembly 148 therein may be included in a different system (other than a fuel cell system) without departing from the scope of the present disclosure.

The fuel cell system 100 may include a fuel cell stack 104 containing a plurality of fuel cells. Hydrogen may be supplied to the fuel cell stack 104 from a tank 106, and oxygen may be supplied to the fuel cell stack 104 to generate electricity by a known chemical reaction. The fuel cell stack 104 may generate electricity for an electric motor 105 and/or other connected electrical devices. The fuel cell system 100 may be included in a vehicle, such as a car, truck, sport utility vehicle, van, motorcycle, aircraft, etc. Accordingly, in some embodiments, the electric motor 105 may convert the electrical power generated by the fuel cell stack 104 to mechanical power to drive and rotate an axle (and, thus, one or more wheels) of the vehicle. However, it will be appreciated that the fuel cell system 100 may be configured for a different use without departing from the scope of the present disclosure.

Oxygen may be provided to the fuel cell stack 104, at least in part, by the charging device 102. The charging device 102 may be configured as an electric compressor device (i.e., electric supercharger) with a single-stage compressor in some embodiments.

As shown in FIG. 1, the charging device 102 may generally include a rotating group 118 and a housing 119. The rotating group 118 may be supported for rotation within the housing 119 about an axis of rotation 120 by one or more bearings 121. The bearing(s) 121 may have various configurations, such as a plain bearing, an air bearing, an oil-less bearing, a rolling element bearing, etc.

The charging device 102 may define a motor section 112. The motor section 112 may include the electric motor 103 mentioned above. In addition to the rotor assembly 148, the motor 103 may also include a stator 146, which receives the rotor assembly 148. The stator 146 may include a plurality of windings that conduct electricity. Furthermore, the motor section 112 may include part of the housing 119. In one example, the motor section 112 may include a motor housing 123, which supports the stator 146 and houses both the stator 146 and the rotor assembly 148. The rotor assembly 148 may include a magnet member 220, which will be discussed in detail below. In some embodiments, the fuel cell stack 104 may provide electricity for the stator 146 to drivingly rotate the magnet member 220 of the rotor assembly 148 and other components of the rotating group 118.

The charging device 102 may also include a compressor section 110. In some embodiments, the compressor section 110 may be the sole (only) compressor section of the charging device 102. In other embodiments, there may be a plurality of compressor sections to define a multi-stage charging device 102. The compressor section 110 may include a compressor wheel 130, which is fixed to the rotor assembly 148 to be part of the rotating group 118. Although partially shown in FIG. 1, the compressor wheel 130 may include a hub portion 145 that is fixed to the rotor assembly 148 of the motor section 112 via one or more fasteners, weldments, and/or other attachment. The compressor section 110 may also define part of the housing 119. Specifically, the compressor section 110 may include a compressor housing member 136, which is fixed to an axial end of the motor housing 123, and which defines an axial inlet 138, a shroud member 139, and a volute member 140. The axial inlet 138, shroud member 139, and volute member 140 may be attached together in a unitary, one-piece compressor housing member 136. The axial inlet 138 may be tubular, straight, and centered on the axis 120. The shroud member 139 may be inversely shaped according to components of the compressor wheel 130. The volute member 140 may define a volute passage 142 therein that extends about the axis 120. The volute member 140 may also define an outlet 143.

Accordingly, the motor 103 may drivingly rotate the compressor wheel 130 about the axis 120. An inlet airstream (represented by arrows 122) may flow into the inlet 138, flow through the shroud member 139, and flow into the volute passage 142. A resultant compressed airstream (represented by arrow 124) may be directed to an intercooler 128 and then to the fuel cell stack 104 for boosting the operating efficiency of the fuel cell system 100.

Furthermore, an exhaust gas stream (represented by arrow 132) from the fuel cell stack 104 may be exhausted to atmosphere as represented in FIG. 1. Stated differently, the exhaust gas stream 132 may be directed away from the charging device 102. In other embodiments, the exhaust gas stream 132 may be directed back toward the charging device 102, for example, to drive rotation of a turbine wheel that is included in the rotating group 118. This may, in turn, drive rotation of the compressor wheel 130, for example, to assist the electric motor 103.

Various components of the fuel cell system 100 may be controlled by a control system 134. The control system 134 may be a computerized system with a processor, various sensors, and other components for electrically controlling operation of the motor 103, the fuel cell stack 104, and/or other features of the system 100. In some embodiments, the controller 134 may define or may be part of the electrical control unit (ECU) of a vehicle.

Figure 2:
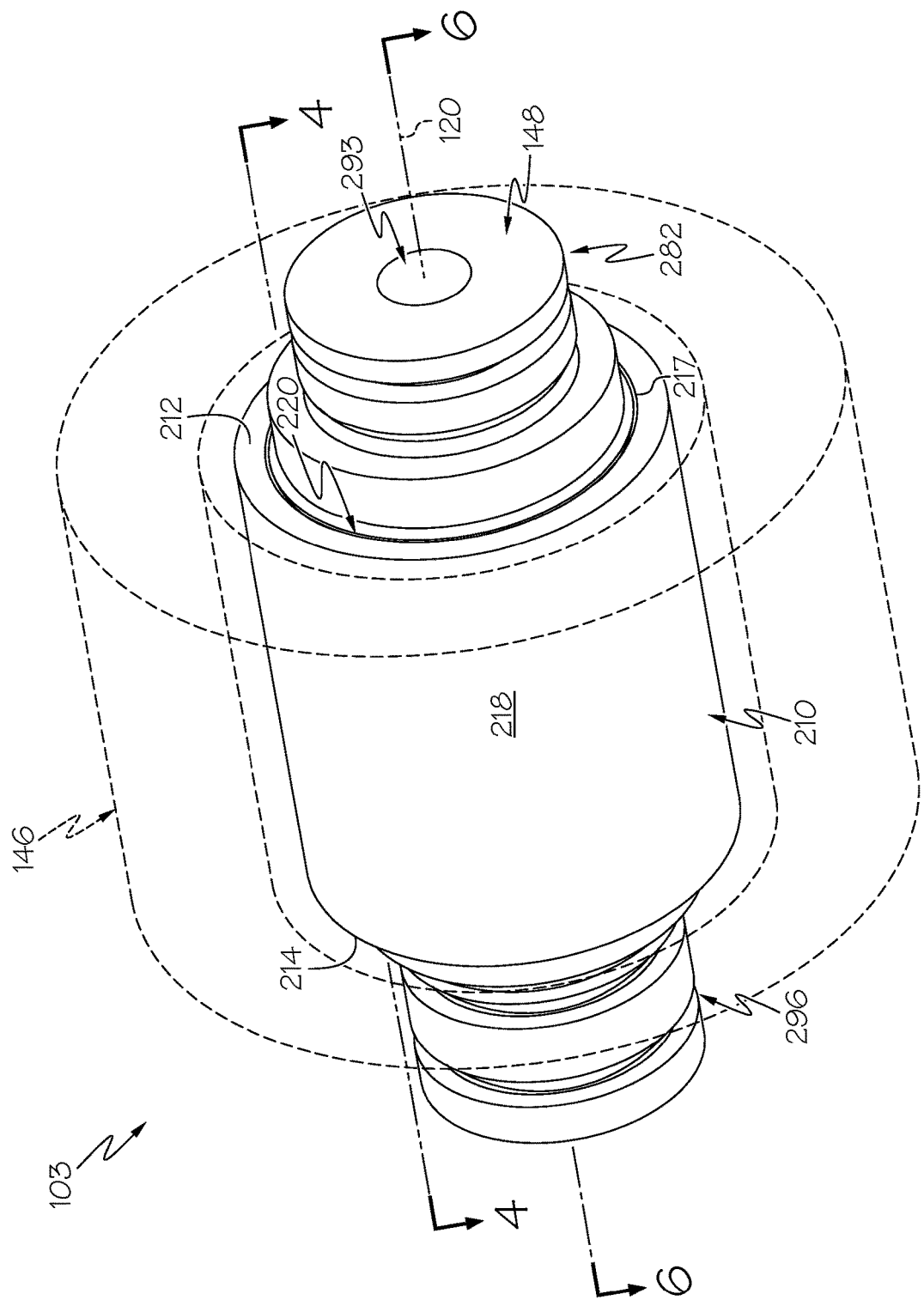
FIG. 2 is a perspective view of a rotor assembly of the permanent magnet electric motor of FIG. 1, wherein the rotor assembly is shown in an assembled state.

Referring now to FIG. 2, the rotor assembly 148 of the motor 103 will be discussed in greater detail according to example embodiments of the present disclosure. The stator 146 is shown schematically and in phantom to reveal the rotor assembly 148.

Figure 3:
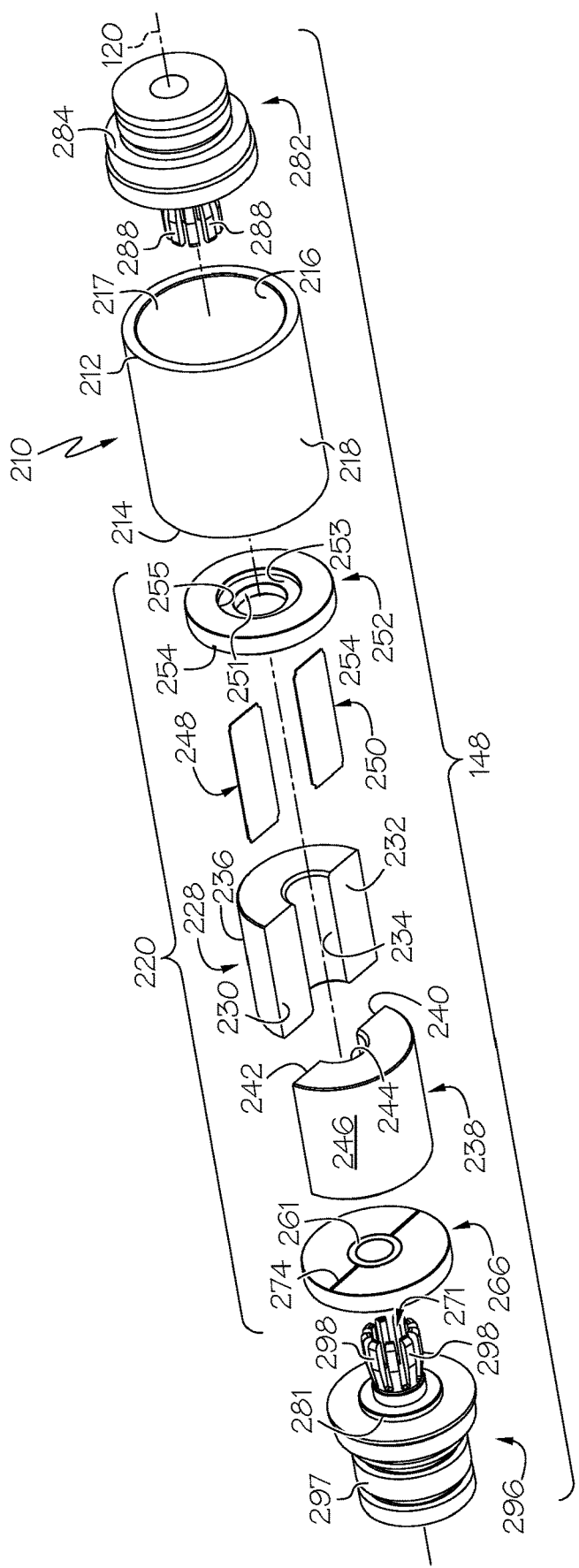
FIG. 3 is an exploded perspective view of the rotor assembly of FIG. 2.
Figure 4:
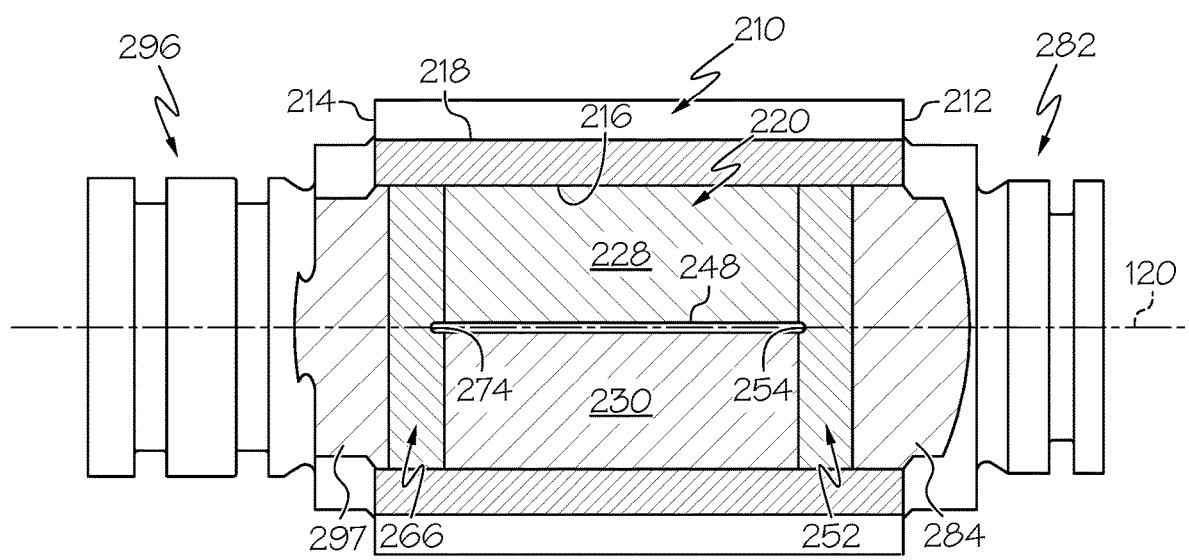
FIG. 4 is a cross-sectional view of the rotor assembly taken along the line 4-4 of FIG. 2.

As shown, the rotor assembly 148 may include a jacket member 210. The jacket member 210 may be a unitary, hollow tube. In some embodiments, the jacket member 210 may be centered about the axis 120. The jacket member 210 may include a first end 212 and a second end 214 that are spaced apart along the axis 120. As shown in FIGS. 3 and 4, the jacket member 210 may also include an inner surface 216 (inner diameter surface) that faces and encircles the axis 120. As shown in FIGS. 2-4, the jacket member 210 may also include an outer surface 218 (outer diameter surface) that faces outward radially from the axis 120. The inner and/or outer surfaces 216, 218 may be smooth and continuous in some embodiments. Also, in some embodiments, the inner surface 216 may be disposed at a constant inner diameter radius, and the outer surface 218 may be disposed at a constant outer diameter radius. Also, the inner surface 216 may define a central bore 217 extending axially through the jacket member 210.

Figure 6:
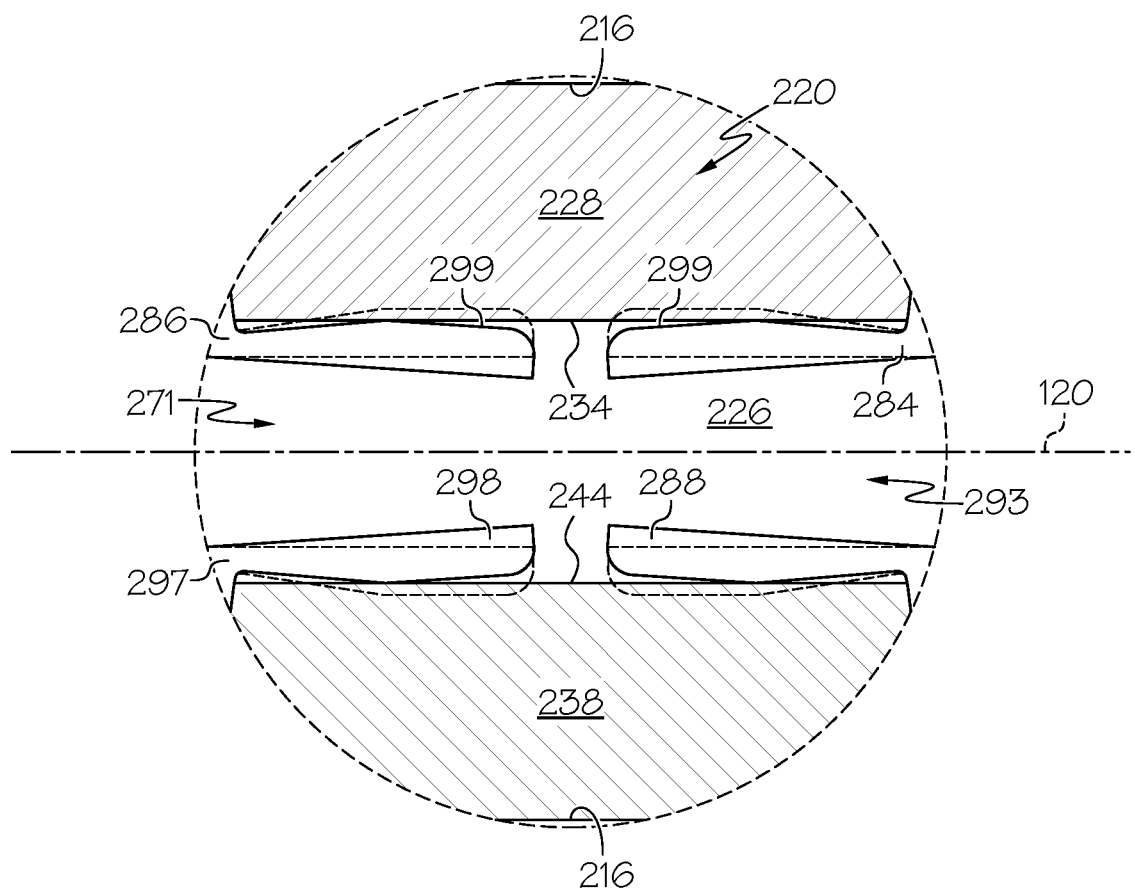
FIG. 6 is a cross-sectional view of the rotor assembly taken along the line 6-6 of FIG. 2.

The rotor assembly 148 may further include the magnet member 220. The magnet member 220 may be substantially cylindrical and hollow so as to define a central aperture 226 (FIGS. 1 and 6). The central aperture 226 may be centered on and may extend through the magnet member 220 along the axis 120 from an open first end 222 to an open second end 224 (FIG. 1).

As shown in FIG. 3, the magnet member 220 may comprise and include a plurality of segments that are constructed from and that include a permanent magnet. In some embodiments, for example, the magnet member 220 includes a first arcuate magnet segment 228 and a second arcuate magnet segment 238. The first and second magnet segments 228, 238 may be arranged about the axis 120 at different angular positions. The first arcuate magnet segment 228 may be referred to as a north pole magnet, and the second arcuate magnet segment 238 may be referred to as a south pole magnet. Although only two magnet segments are shown, it will be appreciated that the magnet member 220 may include more than two segments arranged about the axis 120 without departing from the scope of the present disclosure.

As shown in FIG. 3, the first arcuate magnet segment 228 may be arcuate (e.g., semi-circular) and may extend in a circumferential direction about the axis 120 between a first circumferential edge 230 and an opposite second circumferential edge 232. The first arcuate magnet segment 228 may also extend along the axis 120. The first arcuate magnet segment 228 may further include an inner face 234 that faces and arcuately contours about the axis 120. Moreover, an outer face 236 may face radially outward from the axis 120 and may arcuately contour about the axis 120.

The second arcuate magnet segment 238 may be substantially similar to the first arcuate magnet segment 228. Accordingly, the second arcuate magnet segment 238 may be arcuate (e.g., semi-circular) and may extend in a circumferential direction about the axis 120 between a first circumferential edge 240 and a second circumferential edge 242. The second arcuate magnet segment 238 may further include an inner face 244 that faces and arcuately contours about the axis 120. Moreover, an outer face 246 may face radially outward from the axis 120 and may arcuately contour about the axis 120.

Furthermore, the magnet member 220 may include a first inter-magnet plate 248 and a second inter-magnet plate 250. The first and/or second inter-magnet plates 248, 250 may be a flat, rectangular sheet of ferro-magnetic material, such as magnetic steel. The plates 248, 250 may have a constant sheet thickness in some embodiments. In some embodiments, the plate 248 may be sandwiched between the first and second arcuate magnet segments 228, 238, and the plate 250 may be sandwiched between the segments 228, 238 in a different circumferential position. Stated differently, the first inter-magnet plate 248 may be disposed in a circumferential direction between the first circumferential edge 230 of the first arcuate magnet segment 228 and the second circumferential edge 242 of the second arcuate magnet segment 238. Similarly, the second inter-magnet plate 250 may be disposed in a circumferential direction between the first circumferential edge 240 of the second arcuate magnet segment 238 and the second circumferential edge 232 of the first arcuate magnet segment 228. Thus, in some embodiments, the first and second inter-magnet plates 248, 250 may be spaced approximately one hundred eighty degrees (180°) apart with respect to the axis 120.

The magnet member 220 may further include a first axial end plate 252. The first axial end plate 252 may be an annular disc made from a strong and rigid material. The first axial end plate 252 may include a central opening 251 that is centered on the axis 120. The first axial end plate 252 may also include an annular recess 253 on an outer axial face thereof. The annular recess 253 may include an inner diameter surface 255 that faces the axis 120. The inner diameter surface 255 may define at least part of the central opening 251 in some embodiments.

Moreover, the magnet member 220 may include a second axial end plate 266. The second axial end plate 266 may be substantially similar to the first axial end plate 252. Accordingly, the second axial end plate 266 may be an annular disc made from a strong and rigid material. The second axial end plate 266 may include a central opening 261 that is centered on the axis 120. Although not shown, the second axial end plate 266 may also include an annular recess (similar to the recess 253) on an outer axial face thereof.

The first axial end plate 252 may be disposed on one axial end of the arcuate magnet segments 228, 238. The second axial end plate 266 may be disposed on the opposite axial end of the arcuate magnet segments 228, 238. The outer axial faces of the first and second end plates 252, 266 may face away from the axial center of the magnet member 220 and may define the outer axial areas of the magnet member 220.

Additionally, as shown in FIGS. 3 and 4, the inner axial face of the second axial end plate 266 may include a slot 274. The slot 274 may be straight and may extend radially (FIG. 3). The longitudinal axis of the slot 274 may intersect the axis 120, and the central opening 261 may bisect the slot 274 in some embodiments. The slot 274 may be open at the outer diameter edge of the second axial end plate 266 and/or at the central opening 261. As shown in FIGS. 3 and 4, the first axial end plate 252 may similarly include a slot 254 on the inner axial face thereof.

Thus, in some embodiments, the magnet member 220 may be collectively defined by the first and second arcuate magnet segments 228, 238, the first and second inter-magnet plates 248, 250, and the first and second axial end plates 252, 266. Thus, the arcuate magnet segments 228, 238, the inter-magnet plates 248, 250, and the end plates 252, 266 may be arranged about the axis 120 and may collectively define the open first end 222 and the open second end 224 of the magnet member 220. Also, the inner faces 234, 244 of the magnet segments 228, 238 and the inner radial edges of the inter-magnet plates 248, 250 may define a majority of the inner diameter surface of the magnet member 220.

As shown in FIG. 4, the first axial end plate 252 may be engaged with the first inter-magnet plate 248. For example, as shown, the axial edge of the inter-magnetic plate 248 may be received within the slot 254 of the first axial end plate 252. The opposite axial edge of the plate 248 may be similarly received in the slot 274 of the second axial end plate 266 to engage therewith. Likewise, the second inter-magnet plate 250 may be received within the slots 254, 274 to engage with the first and second axial end plates 252, 266. Accordingly, the axial end plates 252, 266 may be fixedly attached to the inter-magnet plates 248, 250 and retained against relative rotation about the axis 120. Also, as shown in FIG. 4, the inner axial face of the first and second axial end plates 252, 266 may be disposed closely adjacent the axial ends of the first and second arcuate magnet segments 228, 238. These opposing faces may be in abutting contact in some embodiments. Thus, the magnet segments 228, 238, the end plates 252, 266, and the inter-magnet plates 248, 250 may be retained together for rotation as a unit about the axis 120, at least partly because of the engagement between the end plates 252, 266 and the inter-magnet plates 248, 250. Also, the inter-magnet plates 248, 250 may limit (prevent) shifting of the magnet segments 228, 238 in the circumferential direction about the axis 120.

The magnet member 220 may be received within the jacket member 210. As will be discussed, in some embodiments, the outer face 236 of the first arcuate magnet segment 228 may abut against the inner surface 216 of the jacket member 210. Likewise, the outer face 246 of the second arcuate magnet segment 238 may abut against the inner surface 216. Also, in some embodiments, the outer edges of the first and second inter-magnet plates 248, 250 may abut against the inner surface 216. Furthermore, the outer diameter surfaces of the first and second axial end plates 252, 266 may be proximate (e.g., may abut against) the inner surface 216.

The rotor assembly 148 may further include a shaft arrangement 280. The shaft arrangement 280 may have a variety of configurations without departing from the scope of the present disclosure. In general, at least part of the shaft arrangement 280 may be received in the central aperture 226 of the magnet member 220 and may be engaged with the magnet member 220. Also, the shaft arrangement 280 may have a preload that biases parts of the magnet member 220 in an outward radial direction toward and against the inner surface 216 of the jacket member 210 to thereby position the magnet member 220 and to retain the magnet member 220 and the jacket member 210 together. Furthermore, the shaft arrangement 280 may support other features of the rotating group 118 as well. For example, the compressor wheel 130 may be fixed on and supported by the shaft arrangement 280 for rotation about the axis 120. Also, in some embodiments, the shaft arrangement 280 may be supported by the bearing(s) 121 for rotation about the axis 120 relative to the stator 146 and the housing 119.

Figure 5:
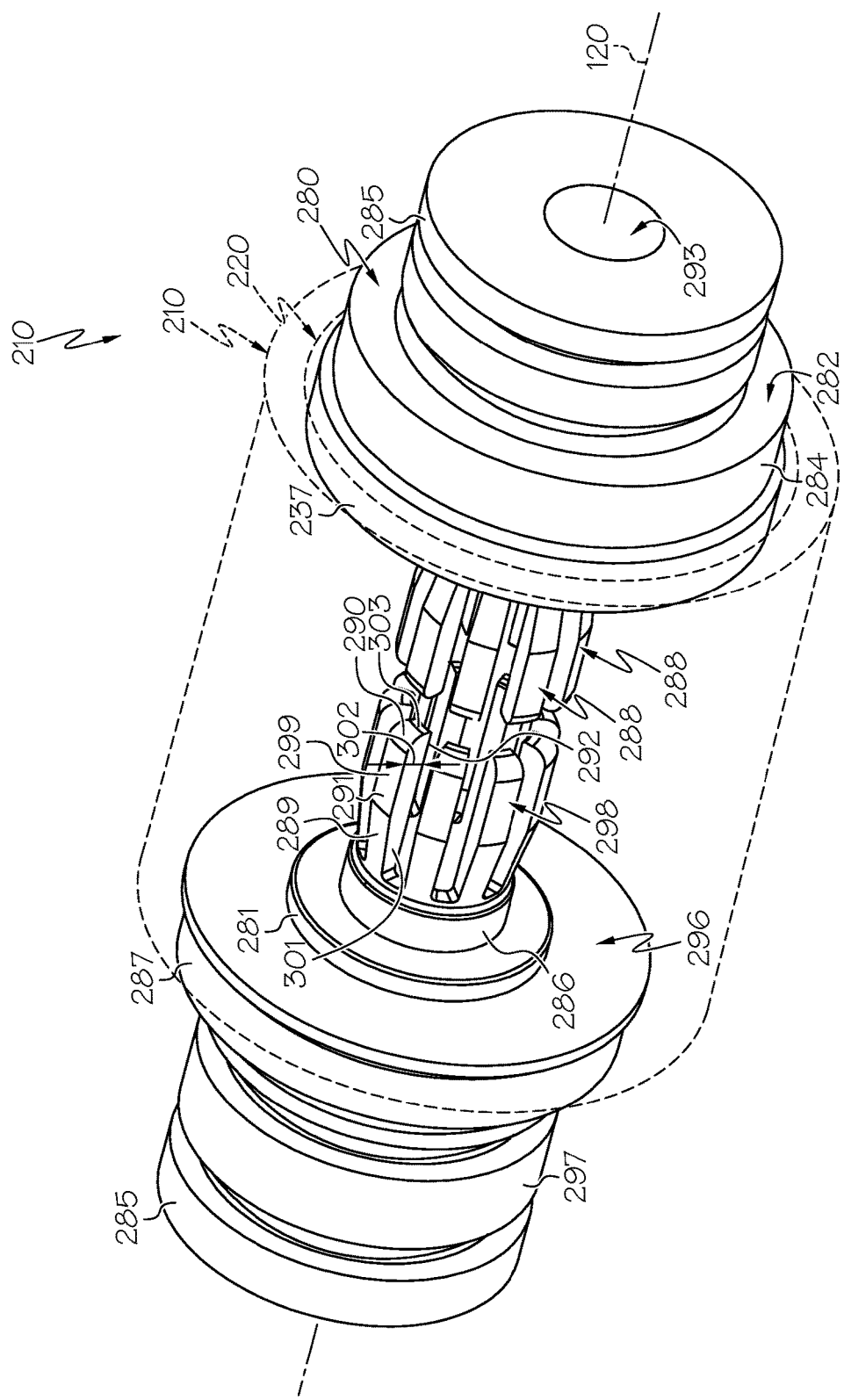
FIG. 5 is a perspective view of shaft structures of the rotor assembly of FIG. 2.

The shaft arrangement 280 is shown in isolation in FIG. 5 with the magnet member 220 and the jacket member 210 represented partly and schematically in phantom. In some embodiments, the shaft arrangement 280 may include a first shaft structure 282 and a second shaft structure 296. The first shaft structure 282 may be referred to as a first stub shaft in that the first shaft structure 282 extends partly along the axis 120, and the second shaft structure 296 may be referred to as a second stub shaft in that the second shaft structure 296 extends partly along the axis 120. Also, as shown in FIG. 1, the first and second shaft structures 282, 296 may be spaced apart at an axial distance 300 along the axis 120 with the first shaft structure 282 disposed proximate one axial end of the rotor assembly 148 and the second shaft structure 296 disposed proximate the opposite axial end. The first shaft structure 282 may be substantially similar to the second shaft structure 296.

Generally, as represented in FIG. 5, the first shaft structure 282 may be a unitary, one-piece member that includes a base member 284 and one or more first biasing projections 288 that project axially from the base member 284. The base member 284 and the plurality of first biasing projections 288 may be made from strong metallic material. Also, a bore 293 may extend through the first shaft structure 282. The bore 293 may comprise an opening that is centered on the axis 120 and that passes continuously through the base member 284 and between the first biasing projections 288 from one axial end of the first shaft structure 282 to the other.

Likewise, the second shaft structure 296 may be a unitary, one-piece member that includes a base member 297 and one or more second biasing projections 298 that project axially from the base member 297. The base member 297 and the plurality of second biasing projections 298 may be made from strong metallic material. Also, a bore 271 may extend through the second shaft structure 296. The bore 271 may comprise an opening that is centered on the axis 120 and that passes continuously through the base member 294 and between the second biasing projections 298 from one axial end of the first shaft structure 282 to the other.

As shown in FIG. 5, the first and/or second base members 284, 297 may be hollow and substantially cylindrical with one or more circumferential grooves, disc-like projections, etc. Also, the first and/or second base members 284, 297 may include an outer axial end 285, an inner axial end 286, and an intermediate portion 287 axially disposed therebetween. The diameter of the intermediate portion 287 may be greater than that of the outer axial end 285. The diameter of the intermediate portion 287 may be greater than that of the inner axial end 286. Also, the inner axial end 286 may include a shoulder 281 with an outer diameter surface facing outward radially. As shown in FIG. 1, the first base member 284 may define a base thickness 295 measured radially from the inner diameter surface defining the bore 271 and the outer diameter surface of the first base member 284. The second base member 297 defines a corresponding base thickness dimension as well. As shown in FIG. 1, the base thickness 295 of the first base member 284 may vary along the axis 120 according to surface features (e.g., grooves and projections) included on the outer diameter surface of the first base member 284, whereas the thickness of the second base member 297 may vary along the axis 120 according to diameter changes at the inner and outer diameter surfaces of the second base member 297. In some embodiments, the diameter of the bore 271 through the outer axial end 285 is greater than the diameter of the bore 271 through the inner axial end 286 so as to receive portions of the compressor wheel 130, fasteners, and/or other components of the rotating group 118.

The first and/or second biasing projections 288, 298 may comprise finger-like elongate members as shown in FIG. 5. The first and/or second biasing projections 288, 298 may be elongate, substantially straight members with a first section 289, an end 290, and an intermediate section 291. The first section 289 may be attached to the inner axial end 286, and the intermediate section 291 and the end 290 may project axially therefrom with the intermediate section 291 disposed axially between the first section 289 and the end 290. The biasing projections 288, 298 may have an inner surface 292, which faces radially inward and which may define part of the respective bore 293, 271. In some embodiments, the inner surface 292 may be contoured circumferentially about the axis 120 and may have a radius that remains constant along the axial length of the projection 288, 298. The biasing projections 288, 298 may also have an outer surface 299, portions of which may be planar, and portions of which may be contoured. Moreover, the biasing projections 288, 298 may include two planar side surfaces 301 that face in opposite tangential directions relative to the axis 120. Accordingly, in some embodiments, the inner surface 292, the outer surface 299, and the two side surfaces 301 may collectively define a rectangular cross section (taken perpendicular to the axis 120) for the respective biasing projection 288, 298.

As shown in FIG. 5, the first and/or second biasing projections 288, 298 may have a thickness 302 (thickness dimension) that is measured radially between the inner surface 292 and the outer surface 299. The thickness 302 may vary along the length of the biasing projection 288, 298. In some embodiments, the thickness 302 along the first section 289 may gradually increase as the biasing projection 288, 298 extends axially away from the axial end 286. The thickness 302 may increase gradually until reaching the intermediate section 291, across which, the thickness 302 may remain constant. Additionally, the thickness 302 may gradually reduce (taper) along the end 290. In some embodiments, the end 290 may have convex curvature and the thickness may gradually reduce (taper) until the end 290 terminates at a terminal end 303. In some embodiments, the end 290 may have three-dimensional contour so that the end 290 contours in a plane that intersects the end 290 and the axis 120 and contours in a plane that is perpendicular to the axis 120. These features may enable and facilitate assembly of the rotor assembly 148 as will be discussed in more detail below.

The first biasing projections 288 may project axially from the first base member 284, and the second biasing projections 298 may project axially from the second base member 297. The first and/or second biasing projections 288, 298 may be arranged (e.g., substantially evenly spaced circumferentially) about the axis 120 in a circular arrangement. The arrangement may be centered about the axis 120. There may be any number of first biasing projections 288 and any number of second biasing projections 298. For example, as shown in the illustrated embodiment, there may be nine first biasing projections 288 spaced approximately forty degrees (40°) apart about the axis 120. Likewise, there may be nine second biasing projections 298 spaced approximately forty degrees (40°) apart about the axis 120. The first biasing projections 288 may be substantially similar to each other. Also, the second biasing projections 298 may be substantially similar to each other. Furthermore, in some embodiments, the first and second biasing projections 288, 298 may be substantially similar to each other.

The first section 289 may be an area of reduced thickness that allows resilient flexure (bending) of the biasing projections 288, 298 under an applied load directed radially inward. Stated differently, the thickness 302 (FIG. 5) across the first section 289 may be less than the base thickness 295 (FIG. 1) proximate the attachment of the first section 289. Also, the thickness 302 across the first section 289 may be less than the thickness 302 across the intermediate section 291. Accordingly, one or more biasing projections 288, 298 may be resiliently flexible relative to the respective base member 284, 297 between a neutral position and a loaded position. The neutral position is shown in phantom lines in FIG. 6 and the loaded (flexed) position is shown in solid lines. The biasing projections 288, 298 may bend about an axis that extends perpendicular to the axis 120 proximate the first section 289. Accordingly, the first section 289 may be referred to as a "bending section" of the respective biasing projection 288, 298. The biasing projections 288, 298 may resiliently bend inward toward the axis 120 when moving from the neutral position toward the loaded position, thereby moving the intermediate section 291 and the end 290 closer to the axis 120. Conversely, when the applied load is reduced or removed, the biasing projection 288, 298 may resiliently recover back outward in the radial direction toward the neutral position, thereby moving the intermediate section 291 and the end 290 further from the axis 120.

As shown in FIGS. 1 and 6, the first shaft structure 282 and the second shaft structure 296 may be fixedly attached to the magnet member 220. For example, the first shaft structure 282 may be partly received within the first end 222 of the central aperture 226 of the magnet member 220, and the second shaft structure 296 may be partly received within the second end 224 of the central aperture 226 of the magnet member 220. The first and second biasing projections 288, 298 may be received within central aperture 226 of the magnet member 220 and may axially extend toward each other. As shown in FIG. 6, at least part of the outer surfaces 299 may abut against and engage the inner diameter surfaces of the central aperture 226. More specifically, some of the first and second biasing projections 288, 298 may abut against the inner face 234 of the first arcuate magnet segment 228 while others may abut against the inner face 244 of the second arcuate magnet segment 238. Furthermore, in some embodiments, at least some of the first and second biasing projections 288, 298 may abut against the inner edges of the inter-magnet plates 248, 250.

The biasing projections 288, 298 may be disposed in the loaded position when disposed in the magnet member 220 (FIG. 6) because the diameter of the central aperture 226 is smaller than the diameter collectively defined by the outer surfaces 299 of the biasing projections 288, 298. Accordingly, the biasing projections 288, 298 may be biased to resiliently recover toward the neutral position when attached to the magnet member 220. As such, the biasing projections 288, 298 have a bending preload that collectively biases the components of the magnet member 220 toward the inner surface 216 of the jacket member 210 outward radially. This radial load may be distributed substantially evenly about the axis 120. Specifically, the load from the first and second biasing projections 288, 298 may bias the first and second arcuate magnet segments 228, 238 and the first and second inter-magnet plates 248, 250 outward against the inner diameter surface of the jacket member 210. One group of first and second biasing projections 288, 298 may bias the first arcuate magnet segment 228 generally in one radial direction away from the axis 120, and another group of first and second biasing projections 288, 298 may bias the second arcuate magnet segment 238 generally in an opposite radial direction away from the axis 120. Thus, the biasing projections 288, 298 may retain the magnet member 220 and the jacket member 210 together. The biasing projections 288, 298 may also retain the arcuate magnet segments 228, 238 in a predetermined and fixed position with the jacket member 210, for example, by increasing friction therebetween.

Additionally, the inner axial end 286 of the first shaft structure 282 may be received in the central opening 251 of the first axial end plate 252. The inner axial end 286 of the second shaft structure 296 may be similarly received in the central opening 261 of the second axial end plate 266. In this position, the outer diameter surface of the shoulder 281 of the shaft structures 282, 296 may abut the inner diameter surface 255 of the first and second axial end plates 252, 266, respectively. Accordingly, the first shaft structure 282 may be engaged with the first axial end plate 252, and the outer axial end 285 may project axially away from the magnet member 220 and the jacket member 210. Likewise, the second shaft structure 296 may be engaged with the second axial end plate 266, and the outer axial end 285 may project axially away from the magnet member 220 and the jacket member 210.

Manufacture of the rotor assembly 148 will now be discussed with reference to FIG. 3. The parts of the rotor assembly 148 described above may be constructed or otherwise provided using casting techniques, additive manufacturing, or other manufacturing methods. Then, the first arcuate magnet segment 228, the first inter-magnet plate 248, the second arcuate magnet segment 238, and the second inter-magnet plate 250 may be assembled together in the cylindrical configuration described above. Next, in some embodiments, the jacket member 210 may be placed over and may receive the assembled first arcuate magnet segment 228, the first inter-magnet plate 248, the second arcuate magnet segment 238, and the second inter-magnet plate 250.

In some embodiments, there may be sufficient radial clearance (e.g., between the inner surface 216 and the outer faces 236, 246) at or about room temperature (i.e., normal ambient temperature) to allow the jacket member 210 to slide over the magnet segments 228, 238 (i.e., without having to heat the jacket member 210). Thus, there may be no need for thermally shrinking the jacket member 210 over the magnet member 220. Accordingly, manufacture may be completed in an efficient manner.

Subsequently, the axial end plates 252, 266 may be positioned on the axial ends of the magnet member 220. In some embodiments, the end plates 252, 266 may be positioned with the inter-magnet plates 248 250 received in the slots 254, 274, respectively. Furthermore, the shaft structures 282, 296 may be positioned over the end plates 252, 266 with the ends 290 of the biasing projections 288, 298 abutting the rims of the central openings 251, 261, respectively.

Subsequently, an axial load may be applied (e.g., using a press) to compress the components of the rotor assembly 148 together toward the axial center. As the load is increased, the three-dimensionally and convexly contoured ends 290 may wedge into the central openings 251, 261, camming and bending the biasing projections 288, 298 inward toward the axis 120, allowing the shaft structures 282, 296 to advance inward toward the center of the rotor assembly 148. This axial movement toward the center may be limited by the shaft structures 282, 296 mating against, abutting, and/or engaging the end plates 252, 266, respectively. Furthermore, this axial movement toward the center may be limited by the end plates 252, 266 mating against, abutting, and/or engaging the ends of the magnet segments 228, 238, respectively. Also, this axial movement toward the center may be limited by the inter-magnet plates 248, 250 abutting against the interior surfaces of the slots 254, 274. Also, these components may engage together for locating and guiding the axial and radial movement of the shaft structures 282, 296 as the components are compressed together.

Once fully compressed, the shaft structures 282, 296 may be fixedly attached to the jacket member 210. In some embodiments, the shaft structures 282, 296 may be welded to the jacket member 210. For example, spot welding, laser welding, or other types of welding processes may be used to produce one or more weldments that fixedly attach the jacket member 210 to the shaft structures 282, 296. The weldment(s) may be formed at equally spaced locations about the axis 120 or may be formed as a partial or continuous arcuate weldment about the axis 120. Thus, the rotor assembly 148 may be strong and robust, retaining components together in the axial direction.

Moreover, as discussed, the biasing projections 288, 298 may bias the components of the magnet member 220 outward radially against the jacket member 210. The jacket member 210 may retain the magnet segments 228, 238 at a fixed radial position. Accordingly, the rotor assembly 148 may be strong and robust, retaining components together in the radial direction.

Also, the inter-magnet plates 248, 250 may engage the end plates 252, 266 and limit (prevent) circumferential shifting of the magnet segments 228, 238. Accordingly, the rotor assembly 148 may be strong and robust, retaining components together in the circumferential direction.

Furthermore, as explained above, assembly of the rotor assembly 148 may be completed efficiently, repeatably, and accurately. The parts may be individually formed within tolerances that are very manageable. The biasing projections 288, 298 allow the components to be assembled together and accurately, and the applied preload conveniently positions and retains the magnet segments 228, 238 in place.

Once assembled, the rotor assembly 148 may be attached to the compressor wheel 130 and/or installed within the stator 146 of the motor 103. Then, the motor 103 may be installed within the fuel cell system 100.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A rotor assembly for a permanent magnet electric motor that defines an axis of rotation comprising:
   a jacket member;
   a magnet member that is received within the jacket member, the magnet member defining a central aperture;
   a shaft structure with a base member and a biasing projection that projects from the base member, the biasing projection received within the central aperture of the magnet member, the biasing projection biasing the magnet member toward the jacket member in an outward radial direction away from the axis of rotation for retaining the magnet member and the jacket member together.

2. The rotor assembly of claim 1, wherein the biasing projection projects axially along the axis of rotation from the base member; and wherein the biasing projection is resiliently flexible between a neutral position and a loaded position; and wherein the biasing projection is in the loaded position to bias the magnet member toward the jacket member in the outward radial direction.

3. The rotor assembly of claim 2, wherein the magnet member includes an open first axial end and an open second axial end, the first axial end being opposite the second axial end;

wherein the shaft structure is a first shaft structure with a first base member and a first biasing projection received within the first axial end, the first biasing projection biasing the magnet member in the outward radial direction; and wherein the shaft structure includes a second shaft structure with a second base member and a second biasing projection that projects from the second base member, the second biasing projection received within the second axial end of the magnet member, the second biasing projection cooperating with the first biasing projection to bias the magnet member in the outward radial direction toward the jacket member for retaining the magnet member and the jacket member together.

4. The rotor assembly of claim 3, wherein the first biasing projection and the second biasing projection are spaced apart at an axial distance measured along the axis of rotation.

5. The rotor assembly of claim 1, wherein the biasing projection is one of a plurality of biasing projections that project from the base member, the plurality of biasing projections arranged about the axis of rotation;

the plurality of biasing projections collectively biasing the magnet member radially outward toward the jacket member for retaining the magnet member and the jacket member together.

6. The rotor assembly of claim 5, wherein the shaft structure includes the base member and the plurality of biasing projections that project axially from the base member;

wherein the plurality of biasing projections are spaced substantially evenly about the axis of rotation in a circumferential direction.

7. The rotor assembly of claim 6, wherein the magnet member includes a first arcuate magnet segment and a second arcuate magnet segment, the first and second arcuate magnetic segments extending about the axis of rotation;

wherein a first group of the plurality of biasing projections bias the first arcuate magnet segment toward the jacket member in a first outward radial direction; and wherein a second group of the plurality of biasing projections bias the second arcuate magnet segment toward the jacket member in a second outward radial direction.

8. The rotor assembly of claim 7, further comprising an inter-magnet plate that is disposed in a circumferential direction between the first arcuate magnet segment and the second arcuate magnet segment;

further comprising an axial end plate that is disposed proximate an axial end of the magnet member; and wherein the inter-magnet plate is engaged with the axial end plate.

9. The rotor assembly of claim 1, wherein the shaft structure includes a bore extending therethrough;

wherein the biasing projection has an inner surface partly defining the bore and an outer surface facing outward away from the axis of rotation;

wherein the biasing projection has a thickness measured radially between the inner surface and the outer surface, the thickness varying along the biasing projection;

wherein the biasing projection includes an end section that includes a terminal end of the biasing projection; and wherein, along the end section toward the terminal end, the thickness tapers and reduces.

10. The rotor assembly of claim 9, wherein the biasing projection has a convex curvature at the end section.

11. The rotor assembly of claim 10, wherein the biasing projection is three-dimensionally and convexly contoured at the end section.

12. The rotor assembly of claim 9, wherein the biasing projection includes a bending section, an intermediate section, wherein the bending section is attached to the base member, and wherein the intermediate section is axially disposed between the bending section and the end section; and wherein the base member has a base thickness measured radially proximate the bending section; and wherein the thickness of the biasing projection across the bending section is less than the base thickness; and wherein the thickness of the biasing projection across the bending section is less than the thickness of the biasing projection across the intermediate section.

13. A method of manufacturing a rotor assembly for a permanent magnet electric motor comprising:

providing a shaft structure having an axis, the shaft structure including a base member and a biasing projection that projects from the base member in an axial direction along the axis, the biasing projection being resiliently flexible relative to the base member between a neutral position and a loaded position, the biasing projection resiliently flexed toward the axis when moving from the neutral position toward the loaded position;

providing a magnet assembly that includes a magnet member received within a jacket member, the magnet member including a central aperture; and moving the biasing projection into the central aperture of the magnet member including resiliently flexing the biasing projection away from the neutral position and toward the loaded position to bias the magnet member toward the jacket member in an outward radial direction away from the axis for retaining the magnet member and the jacket member together.

14. The method of claim 13, wherein the biasing projection is one of a plurality of biasing projections that project from the base member, the plurality of biasing projections arranged about the axis; and further comprising attaching the shaft structure to the magnet assembly by moving the plurality of biasing projections, respectively, away from the neutral position toward the loaded position to bias the magnet member radially outward toward the jacket member.

15. The method of claim 14, wherein the magnet member includes a first arcuate magnet segment and a second arcuate magnet segment, the first and second arcuate magnetic segments extending about the axis of rotation;

wherein attaching the shaft structure to the magnet assembly includes biasing the first arcuate magnet segment toward the jacket member in a first outward radial direction using a first group of the plurality of biasing projections; and wherein attaching the shaft structure to the magnet assembly includes biasing the second arcuate magnet segment toward the jacket member in a second outward radial direction using a second group of the plurality of biasing projections.

16. The method of claim 15, further comprising providing an axial end plate proximate an axial end of the magnet member;

further comprising disposing an inter-magnet plate between the first arcuate magnet segment and the second arcuate magnet segment in a circumferential direction about the axis; and further comprising engaging the inter-magnet plate with the axial end plate.

17. The method of claim 13, wherein the biasing projection has an inner surface and an outer surface and a thickness measured radially between the inner surface and the outer surface, the thickness varying along the biasing projection;

wherein the biasing projection includes an end section that includes a terminal end of the biasing projection;

wherein, along the end section toward the terminal end, the thickness tapers and reduces; and wherein moving the biasing projection into the central aperture includes abutting the end section against the magnet member to cam the biasing projection inward toward the axis.

18. The method of claim 17, wherein the biasing projection has a convex curvature at the end section.

19. The method of claim 13, further comprising:

providing the magnet member with an open first axial end and an open second axial end, the first axial end being opposite the second axial end;

providing the shaft structure as a first shaft structure with a first base member and a first biasing projection received within the first axial end, the first biasing projection biasing the magnet member in the outward radial direction; and further comprising providing a second shaft structure including a second base member and a second biasing projection that projects from the second base member, the second biasing projection being resiliently flexible relative to the second base member between a neutral position and a loaded position; and further comprising moving the second biasing projection into the second axial end including resiliently flexing the second biasing projection away from the neutral position and toward the loaded position to bias the magnet member toward the jacket member in the outward radial direction away from the axis for retaining the magnet member and the jacket member together.

20. A permanent magnet electric motor comprising:

a stator; and a rotor assembly supported for rotation within the stator about an axis of rotation, the rotor assembly comprising:

a jacket member that is hollow and cylindrical;

a first arcuate magnet segment and a second arcuate magnet segment that are received within the jacket member and that extend about the axis of rotation, the magnet member defining a central aperture with an open first axial end and an open second axial end;

an inter-magnet plate that is disposed in a circumferential direction between the first arcuate magnet segment and the second arcuate magnet section;

a first axial end plate disposed proximate the first axial end and engaged with the inter-magnet plate;

a second axial end plate disposed proximate the second axial end and engaged with the inter-magnet plate;

a first shaft structure with a first base member and a plurality of first biasing projections that project from the first base member, the first base member engaged with the first axial end plate, the first biasing projections disposed and spaced circumferentially about the axis of rotation, the first biasing projections received within the central aperture of the magnet member and being resiliently bent inward toward the axis of rotation from a neutral position toward a loaded position to bias the first and second arcuate magnet segments radially outward away from the axis of rotation;

a second shaft structure with a second base member and a plurality of second biasing projections that project from the second base member, the second base member engaged with the second axial end plate, the second biasing projections disposed and spaced circumferentially about the axis of rotation, the second biasing projections received within the central aperture of the magnet member and being resiliently bent inward toward the axis of rotation from a neutral position toward a loaded position to bias the first and second arcuate magnet segments radially outward away from the axis of rotation; and the plurality of first biasing projections being spaced apart axially from the second biasing projections.

* * * * *